US008260848B2

(12) United States Patent
Srivastava et al.

(10) Patent No.: US 8,260,848 B2
(45) Date of Patent: Sep. 4, 2012

(54) RE-HEADERER SYSTEM AND METHOD

(75) Inventors: Vishal Srivastava, Seattle, WA (US); David Janecek, Woodinville, WA (US); Paul Turcotte, Issaquah, WA (US); Eric Lippke, Woodinville, WA (US); Daniel Montgomery, Shoreline, WA (US)

(73) Assignee: Intel Corporation, Santa Clara, CA (US)

( * ) Notice: Subject to any disclaimer, the term of this patent is extended or adjusted under 35 U.S.C. 154(b) by 366 days.

(21) Appl. No.: 12/716,202

(22) Filed: Mar. 2, 2010

(65) Prior Publication Data
US 2010/0223327 A1 Sep. 2, 2010

Related U.S. Application Data

(60) Provisional application No. 61/156,799, filed on Mar. 2, 2009.

(51) Int. Cl.
*G06F 15/16* (2006.01)
(52) U.S. Cl. .................................................. 709/203
(58) Field of Classification Search .................. 709/203, 709/204, 217, 219, 231
See application file for complete search history.

(56) References Cited

U.S. PATENT DOCUMENTS

| 2003/0028489 A1 | 2/2003 | Williamson |
| 2007/0016530 A1 | 1/2007 | Stasi et al. |
| 2008/0155111 A1 | 6/2008 | Takeuchi et al. |

*Primary Examiner* — Joseph Avellino
*Assistant Examiner* — Marshall McLeod
(74) *Attorney, Agent, or Firm* — ÆON Law; Adam L. K. Philipp

(57) ABSTRACT

A re-headerer media packaging and serving system and method are provided herein.

19 Claims, 11 Drawing Sheets

RE-HEADERER SYSTEM AND METHOD

RELATED REFERENCES

This application is a nonprovisional application of U.S. Provisional Application No. 61/156,799; filed Mar. 2, 2009; titled "RE-HEADERER SERVICE"; naming inventors Vishal Srivastava, David Janecek, Paul Turcotte, Eric Lippke, and Dan Montgomery. The above-cited application is incorporated herein by reference in its entirety, for all purposes.

FIELD

The present disclosure relates to packaging and distributing digital-media content, and more particularly to packaging and distributing digital-media content for multiple distributors.

BACKGROUND

As is known in the art, content (text, music, pictures, video, etc.) may be digitally encoded in one of many public or proprietary formats and sent as a file and/or streamed to consumers, optionally including the use of digital rights management ("DRM") technologies to authenticate and authorize use of the content. The encoded content may also comprise or otherwise be associated with metadata; metadata may comprise information regarding the content, such as author, track, title, episode, length, captions, etc., and/or information regarding how the content was encoded and/or about how the content may be decoded, such as file format, sample rate, whether the content was recorded in stereo, a video aspect ratio, methods of error correction, license information, a decryption key, etc., and/or information regarding or by one or more of the parties involved with encoding, storing, or distributing the content, such as an identifier for the party and/or a watermark or similar. Certain of the information in the metadata may be obtained directly from the metadata (assuming access to the metadata and knowledge of how the information is encoded in the metadata) while other of the information may require additional steps, such as obtaining an identifier, URI, address or other identifier from the metadata, which identifier may be used as a reference to obtain (from a database or at another resource or data source) additional information, such as an identify of a party, a decryption key, or similar.

Also as is known, content may be encoded in a file structure comprising a header block and a content data block. Generally speaking, the header block may comprise metadata while the content block comprises the encoded content. The file structure may comprise one or more header blocks associated with one or more content data blocks, often in multiple sequential pairs. For example, an MPEG-1 Audio Layer 3 ("MP3") file may comprise a sequence of MP3 frames (including media-data), which sequence may further be encapsulated in or by an ID3 metadata container (such a metadata container also being referred to herein as an instance of a header comprising metadata).

Also as is known, the content in content files may be encrypted or otherwise cryptographically protected through various DRM systems, in which case the header may be an integral part of (e.g. bound to) the content file such that the content file is not usable without the header, some or all of which header may also be encrypted or otherwise cryptographically protected by a DRM system. Even in the context of content files which are not encrypted, it is useful to be able to reliable track the supply chain, purchaser, and/or use of a particular content file, which may involve binding the header and content together in the content file in a secure or tamper resistant manner.

A provider of content packaging and delivery services, content packager, may be asked by seller A to prepare and/or store content files for different parties, such as resellers B and C, who in turn sell or otherwise provide the content files to consumers. The resulting content files contain the same underlying content, but may have different revocation and authentication URLs or may otherwise have different metadata bearing headers associated with the various distributors (e.g., seller A and resellers B and C) in the supply chain.

Needed is a method and system which can prepare and/or bind and/or provide multiple sets of headers in relation to a common content instance. The preparation and/or binding and/or providing may be performed dynamically (on demand) or in advance and may be performed so as to eliminate or reduce the need to store potentially redundant content data or to eliminate or reduce the amount of processing required to bind the different headers to the content data.

DESCRIPTION

Figure 1:
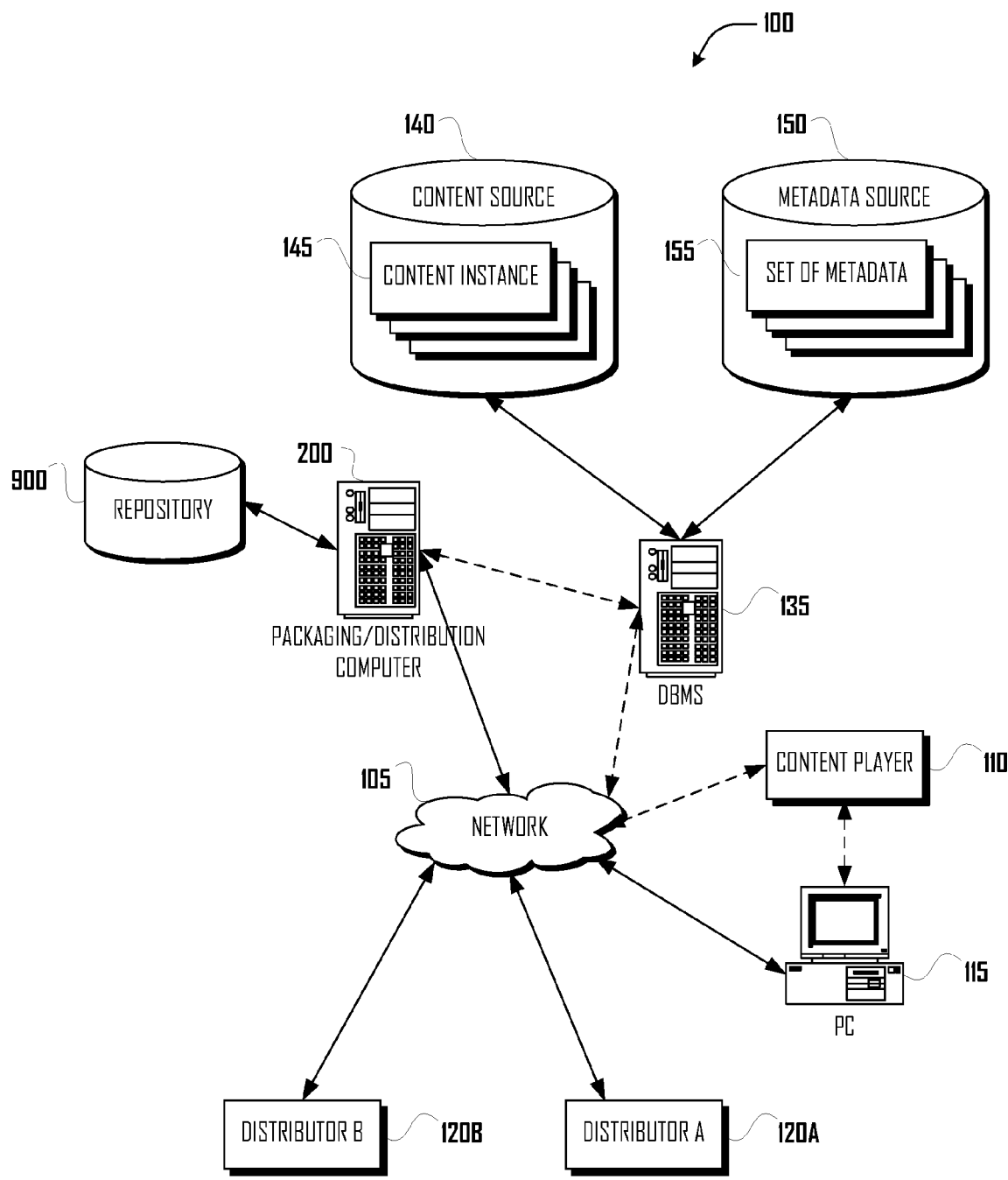
FIG. 1 depicts an exemplary network and device diagram in and through which systems and methods in accordance with one embodiment.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers and memory storage devices. Each of these conventional distributed computing components is accessible by the processor via a communication network.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Figure 8:
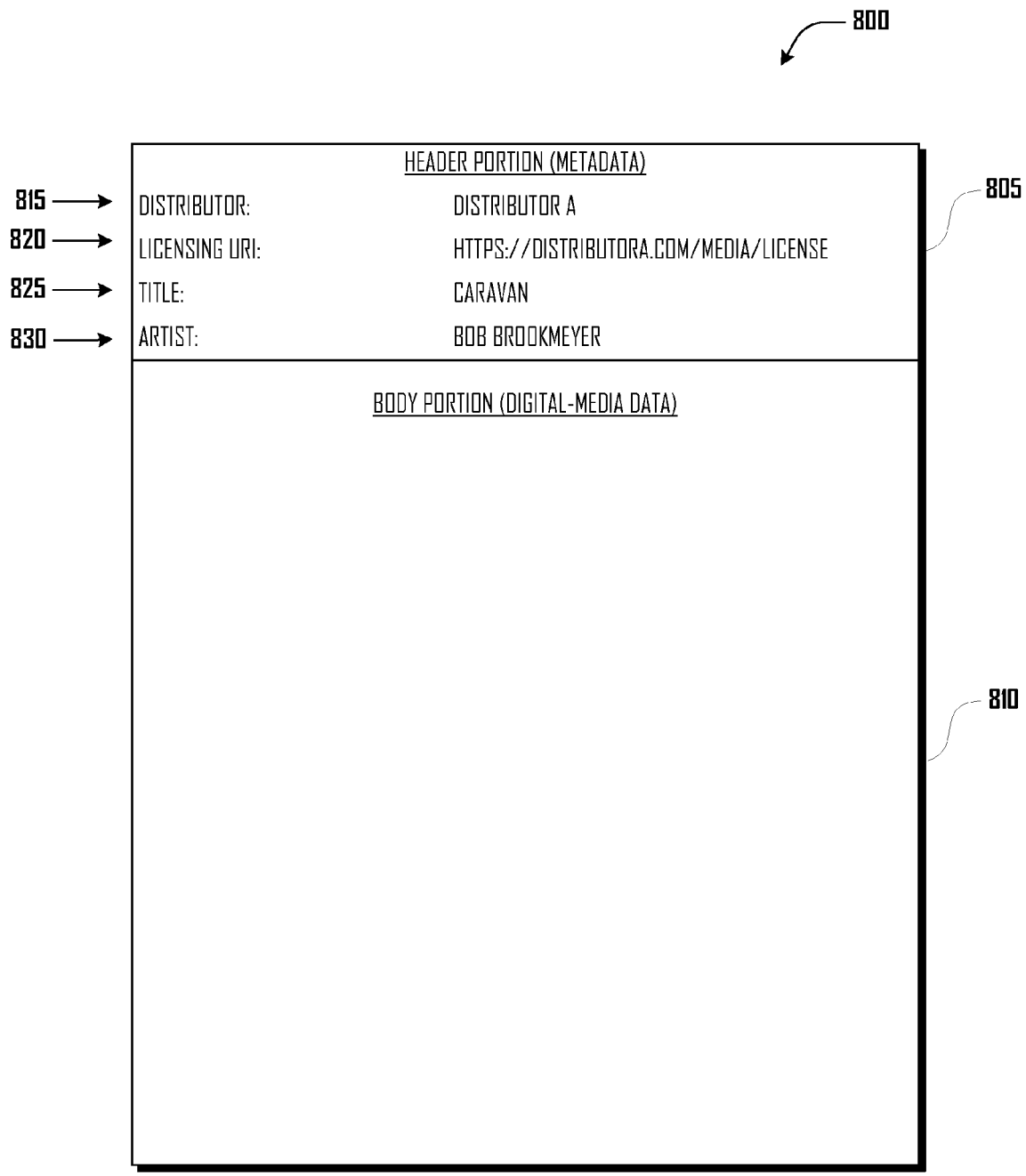
FIG. 8 illustrates an exemplary distribution file in accordance with one embodiment.

As illustrated in FIG. 1, Packaging/Distribution computer 200 provides services such as encoding and/or transcoding and compressing content 145 into one or more distribution file formats, e.g., MP3, MPEG-4 Part 14 ("MP4"), Windows Media Video ("WMV"), Windows Media Audio ("WMA"), Advanced Systems Format ("ASF"), RealAudio, RealVideo, QuickTime, and the like. FIG. 8 illustrates an exemplary distribution file 800, which includes a distribution-file header-portion 805 (which includes metadata) and a distribution-file body portion 810 (which includes media-content data). Distribution-file header-portion 805 includes a small set of exemplary metadata, including metadata 815, 820 that is specific to a particular distributor, as well as metadata 825, 830 that is not specific to a particular distributor.

The implementation details of distribution file 800 will vary according to the distribution-file format employed. For example, a distribution file 800 in MP3 format may implement distribution-file header-portion 805 as an ID3 metadata container and distribution-file body portion 810 as a sequence of MP3 frames. Similarly, a distribution file 800 in ASF format may implement distribution-file header-portion 805 as an ASF header object and distribution-file body portion 810 as one or more ASF content objects (which may encapsulate media data such as WMV, WMA, and the like).

In various embodiments, some or all of distribution-file header-portion 805 and/or distribution-file body portion 810 may be encrypted (e.g., by packaging computer 200). Similarly, in various embodiments, one or more distribution-file header-portions 805 may be bound to one or more distribution-file body portions 810 (or visa-versa) using signing, hashing, and/or cryptographic techniques (e.g., by packaging computer 200); a content player 110 (see FIG. 1) may require corresponding bound header portions in order to properly render body portions.

Referring again to FIG. 1, Packaging/Distribution computer 200 may obtain media content from a source such as a live or pre-recorded event and/or a database of content 140. The content database 140 may comprise content instances, such as content instance 145, in an analog format and/or a digital first data format. In some embodiments, the first data format may be a "lossless" format. In other embodiments, the first data format may be a raw, relatively unprocessed, and/or uncompresssed format. In yet other embodiments, the first data format may also be the same as or similar to a distribution format (such as those discussed above). A content instance 145 may comprise text, music, pictures, video, games, or other works.

In some embodiments, Packaging/Distribution computer 200 may comprise a digital-analog converter, though in many embodiments, a content instance 145 may be available from content source 140 in a digital format, which may then be transcoded into one or more distribution formats. Packaging/Distribution computer 200 and other of the devices shown in FIG. 1 may be provided by a computing device 200, such as is discussed below in relation to FIG. 2.

In various embodiments, Packaging/Distribution computer 200 may obtain sets of metadata from a database, one or more text files, tables, or other metadata source 150, which may include records or entries containing a set of metadata 155 or which provides a reference to where the set of metadata 155 may be obtained. The metadata source 150 and content source 140 may be under the control of the party operating Packaging/Distribution computer 200, or they may be operated separately from Packaging/Distribution computer 200 and/or separately from each other. In many embodiments, data repositories depicted herein (e.g., repository 900, content source 140, metadata source 150) may not reside on one physical device, but may be provided by distributed storage under the control of one or more parties. The metadata source 150 and content source 140 may optionally be managed by a database management system, dbMS 135. The metadata source 150 and content source 140 are depicted as connecting to the dbMS 135, though in alternative embodiments these components may exist independent of a dbMS 135 and/or may comprise or have access to independent network connections (not shown). Certain sets of metadata (e.g. 155) may be obtained from, derived from, and/or stored in content source 140 rather than being separately stored, as depicted.

Figure 9:
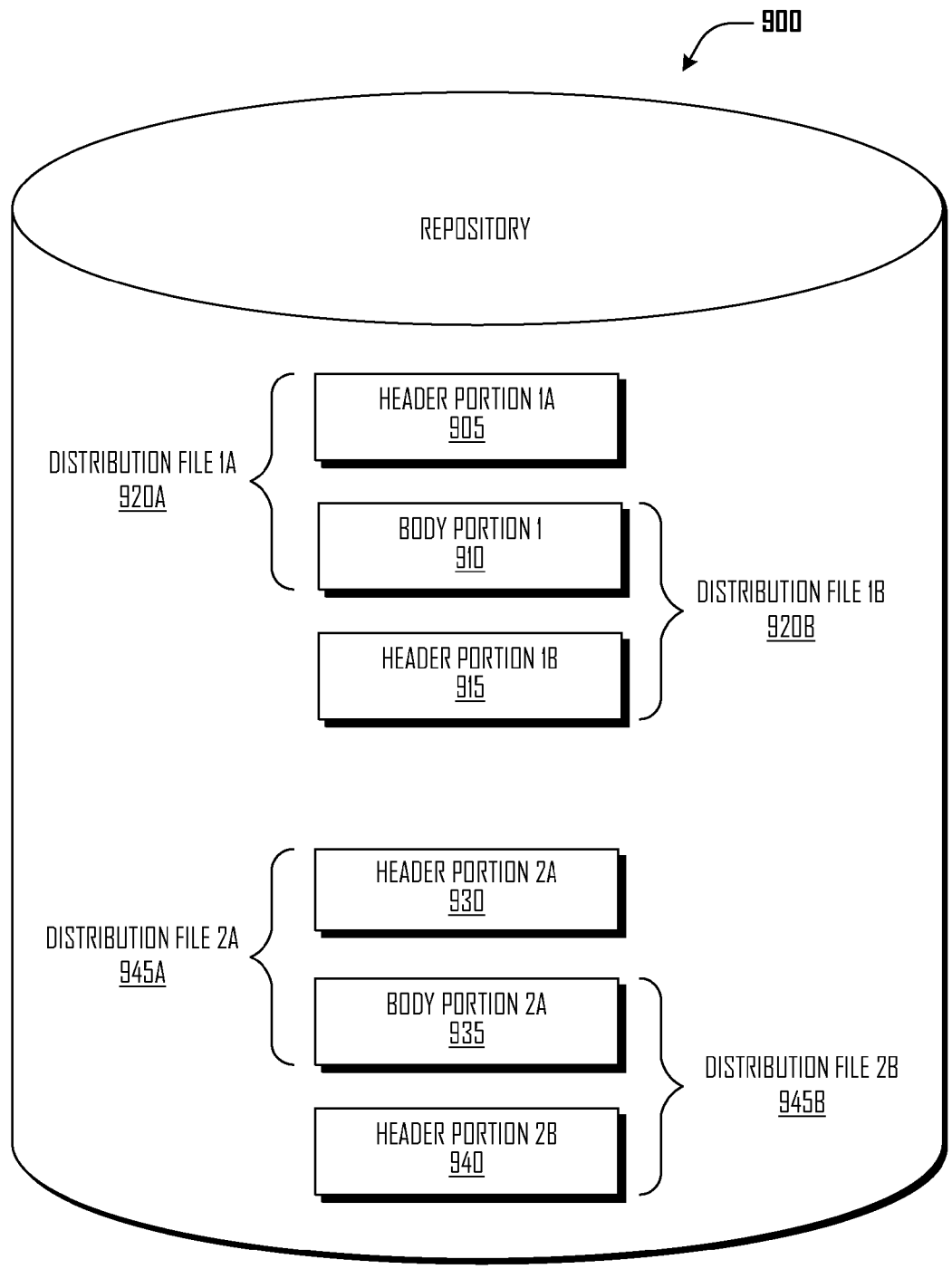
FIG. 9 illustrates an exemplary repository of processed files in accordance with one embodiment.

Packaging/Distribution computer 200 is depicted as connecting to a repository of processed files 900, an exemplary one of which is illustrated in FIG. 9. The repository of processed files 900 may include one or more distribution-file body-portions 910, 935, each of which may be associated with one or more distribution-file header-portions 905, 915, 930, 940. In various embodiments, any of such body- and header-portions may be logically divided or aggregated into binary large objects ("BLOBS"), packets, frames, or other groupings. As discussed further below, one distribution-file body-portion 910, 935, such as may include media-data from a first song, video, book, or other single content instance, may be associated with more than one distribution-file header-portions 905, 915, 930, 940.

For example, as illustrated in FIG. 9, distribution-file body-portion 910 may include media-data for a first discrete content instance, while distribution-file header-portions 905, 915 may be individually combinable with body-portion 910 to form distribution files 920A and 920B, respectively. In one embodiment, header-portion 905 may include metadata associated with a distributor "A" (e.g., Distributor A 120A, see FIG. 1), while header-portion 915 may include metadata associated with a distributor "B" (e.g., Distributor B 120B, see FIG. 1). In such a case, distribution file 920A may be specific to distributor A, while distribution file 920B may be specific to distributor B. Similar relationships may exist between distribution-file body-portion 935 (which may include media-data from a second content instance) and header-portions 930 and 940 (which may include metadata associated with distributors A and B, respectively). Header-portion 930 may be combinable with body-portion 935 to form distribution file 945A, which may be specific to distributor A, while header-portion 940 may be combinable with body-portion 935 to form distribution file 945B, which may be specific to distributor B.

The relationships and depictions illustrated in FIG. 9 and discussed above are a simplification. In some embodiments, the media-data for a content instance may reside in a collection of files or objects. Similarly, in some embodiments, metadata for a distributor may reside in a collection of headers. In such embodiments, the "portions" referred to by blocks 905, 910, 915, 930, 935, 940, and the like, are intended to refer to the collection of files or objects that comprise the indicated header data or body data. In some embodiments, the processed file repository 900 may also be part of the content 140 and/or metadata 150 sources.

Referring again to FIG. 1, the repository of processed files 900 is depicted as comprising a communication connection with a Packaging/Distribution computer 200. In various embodiments, Packaging/Distribution computer 200 may further comprise a Hypertext Transfer Protocol ("HTTP") server or other web server. For example, in one embodiment, Packaging/Distribution computer 200 may comprise an Apache HTTP Server (provided by the Apache Software Foundation of Forest Hill, Md.), an Internet Information Services ("IIS") server (provided by Microsoft Corporation of Redmond, Wash.), or the like. In some embodiments, Packaging/Distribution computer 200 may be implemented as one or more physical and/or logical computing devices. In particular, in some embodiments, one computing device (or group of computing devices) may provide some or all of the media preparation and packaging functionalities described herein, which a second computing device (or group of computing devices) may provide some or all of the distribution functionalities (e.g., web service) described herein.

In many embodiments, Packaging/Distribution computer 200 may be used by consumers, utilizing personal computers ("PCs") 115, content players 110, and/or other computing devices to access one or more content portals (websites, music services, other content delivery services) provided by Distributor A 120A and Distributor B 120B. In some embodiments, Packaging/Distribution computer 200 may provide an entire content portal, such as an entire website and content access through it, or a portion of it, such as song or video which is linked to by a separately maintained content portal (not shown).

In various embodiments, content player 110 may be a special-purpose content rendering computing device, such as an MP3 player, or a multi-function computing device, such as a wireless phone that includes content rendering capabilities. In other embodiments, content player 110 may include a content rendering application executed on a general purpose computing device, such as a PC 115. In some embodiments, PC 115 and the content player 110 may operate independently. In other embodiments, PC 115 and the content player 110 may communicate, such as to transfer content files, metadata, and/or other data. For example, in one embodiment, PC 115 may communicate with content player 110 to provide synchronization between the devices, such as when a consumer utilizes multiple devices to access the content or a content delivery service.

FIG. 1 also depicts Distributor A 120A and Distributor B 120B. Distributors 120A and 120B represent organizations used in an example, herein, wherein Distributor 120A obtains services from the packaging computer 200 (whether operated by Distributor 120A or another party) and desires to allow other organizations, such as Distributor 120B, to sell or resell the services. Distributors 120A and 120B may then engage in a transaction with a consumer to provide distribution files (e.g., 800) from repository 900 to the consumer. Consideration, if any, and/or transaction information may go from the consumer to one of the distributors and then to the other distributor, or to a third party consideration and/or information processor and then to one or both of the distributors.

Figure 2:
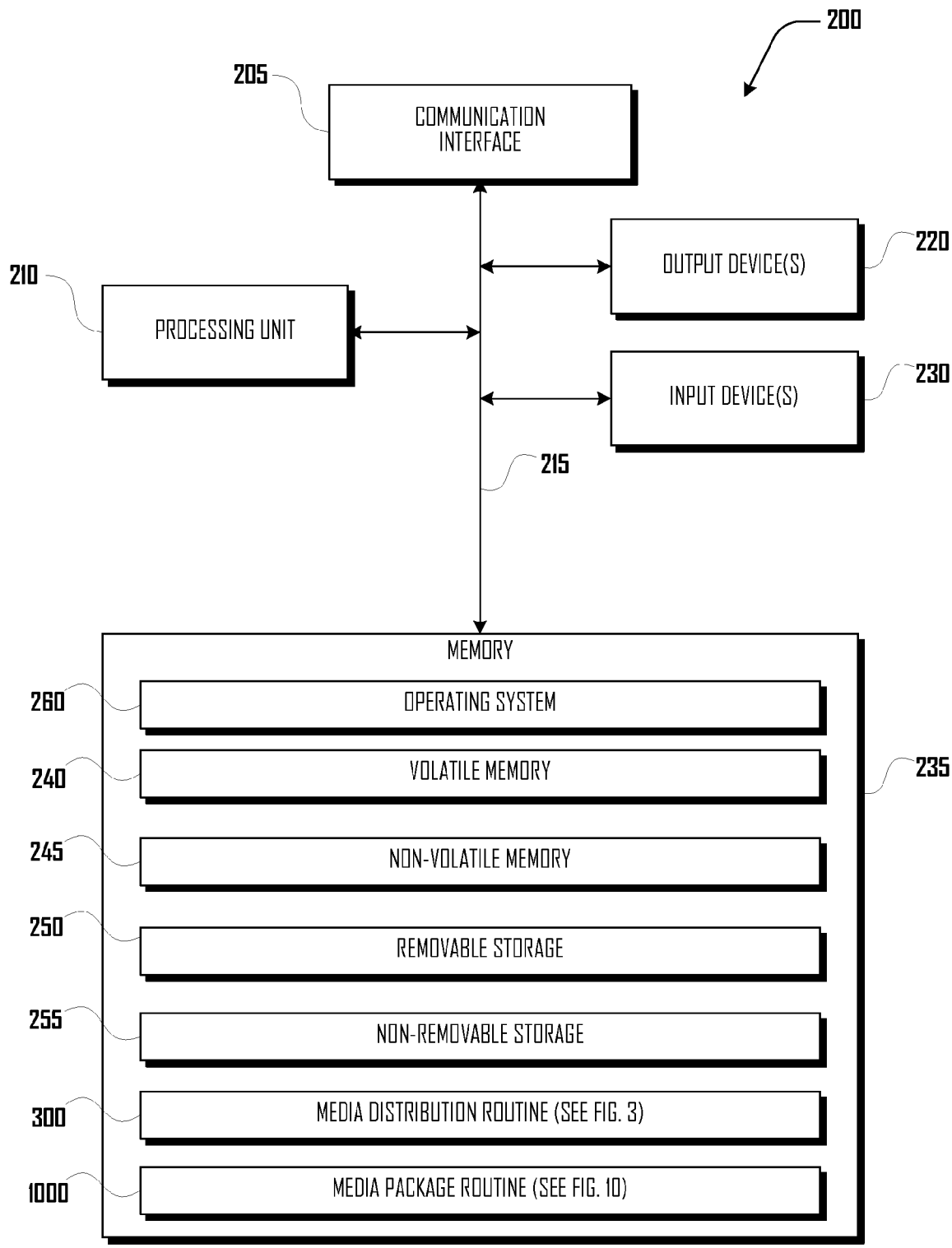
FIG. 2 illustrates a media distribution routine in accordance with one embodiment.

FIG. 2 depicts a functional block diagram of an exemplary computing device that may be used to implement one or more computers used in or by the system, e.g. Packaging/Distribution computer 200, and executing instructions embodying the methods described below. Packaging/Distribution computer 200, in one basic configuration, comprises at least a processor 210 and memory 235. Depending on the exact configuration and type of computing device, memory 235 may be volatile (such as RAM), non-volatile (such as ROM, flash memory, etc.) or some combination of the two, such as programmable ROM.

Computing device 200 includes one or more communication and/or network interfaces 205 that allow computing device 200 to communicate with one or more computers and/or applications. Device 200 may also have input device(s) 230 such as a keyboard, mouse, digitizer or other touch-input device, voice input device, and the like. Output device(s) 220 such as a monitor, speakers, printer, PDA, mobile phone, and other types of digital display devices may also be included. These generally conventional devices are well known in the art and need not be discussed at length here. One or more shared or dedicated buses 215 may connect these and other components and provide internal communication.

Additionally, device 200 may have other features and functionality. For example, device 200 may also include additional storage (removable 250 and/or non-removable 255) including, but not limited to, magnetic or optical disks or tape. Computer storage media includes volatile and nonvolatile, removable and non-removable media implemented in any method or technology for storage of information such as computer readable instructions, data structures, program modules or other data. Memory 235, removable storage 250 and non-removable storage 255 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 200. Any such computer storage media may be part of device 200.

Some or all of computing device 200 may be provided by one or more virtual machine instances or similar executing on one or more host computers, which host computers may be may be mounted in racks and networked, such as in a cluster and/or grid computing system or similar, and/or as may be purchased as a service, for example, The Amazon Elastic Compute Cloud ("Amazon EC2") from Amazon.com, Inc. of Seattle, Wash. and/or the Sun Grid Compute Utility from Sun Microsystems, Inc. of Santa Clara, Calif. The computing device 200 includes system memory 260 containing operating system and software application instructions which are executed by one or more processing units 210, which processing units may include a general purpose processor or processors as well as a special purpose processor, such as may be provided by a video card or similar.

FIG. 2 illustrates a media distribution routine 300 in accordance with one embodiment. In block 305, routine 300 receives a request for media content. In some embodiments, such a request may be received by packaging computer 200 and/or distribution computer 135. Not shown are additional steps that may be present in some embodiments, such as identification of the party making the request, authentication and authorization of the request, obtaining values for parameters which may be possible as part of the request, obtaining consideration, confirming receipt of consideration, and/or satisfaction of other conditions.

In block 307, routine 300 identifies a distributor and a distribution-file associated with the request for media content. In some embodiments, this information may be explicitly included in the request. In other embodiments, some or all of this information may be inferred or otherwise derived from information known about the request. For example, in some embodiments, a distributor may be inferred from an address from which the request originates or other information. Note that the "distribution-file" identified during block 307 may or may not exist as such at the time the file is "identified." For example, in some cases, as discussed below, one or both of a body-portion and a header-portion of the distribution-file may need to be prepared before the identified distribution-file can be created.

In decision block 310, routine 300 determines whether a body-portion of a distribution file 810 corresponding to the request has been previously prepared. For example, in one embodiment, routine 300 may determine whether a corresponding distribution-file body-portion 810 is stored in repository 900. If not, then in block 400, routine 300 may perform subroutine 400 (see FIG. 4, discussed below) to prepare and store a distribution-file body-portion 810 corresponding to the requested media content. If, however, routine 300 determines in block 310 that a body-portion of a distribution file 810 corresponding to the request has been previously prepared, then in block 315, routine 300 obtains the prepared distribution-file body-portion 810, e.g., from a digital-media repository such as repository 900.

In decision block 325, routine 300 determines whether a distribution-file header-portion 805 corresponding to the requested media content and to a distributor associated with the request is cached. For example, in one embodiment, routine 300 checks for the existence of the appropriate header-portion 805 in a header repository, such as repository 900. If routine 300 determines that the appropriate header-portion 805 has not been cached (in repository 900 or elsewhere), then routine 300 may perform subroutine 500 (see FIG. 5, discussed below) to prepare and cache a distribution-file header-portion 805 corresponding to the requested media content and the distributor thereof. If, however, routine 300 determines in block 325 that a distribution-file header-portion 805 corresponding to the request has been previously prepared, then in block 330, routine 300 obtains the prepared distribution-file header-portion 805, e.g., from a header repository such as repository 900.

In decision block 340, routine 300 determines whether to pre-generate one or more additional distribution-file header-portions 805. For example, in some embodiments, when routine 300 receives for the first time a request for a particular piece of media content from a consumer, routine 300 may determine that other consumers may also be interested in obtaining the same piece of media content from other distributors. In such cases, routine may perform subroutine 600 (see FIG. 6, discussed below) to pre-generate and pre-cache other distribution-file header-portions 805 corresponding to the requested media content and other distributors thereof.

In subroutine block 700, routine 300 delivers to the requestor the distribution-file corresponding to the media content request and to the distributor thereof. Routine 300 ends in block 399.

Figure 4:
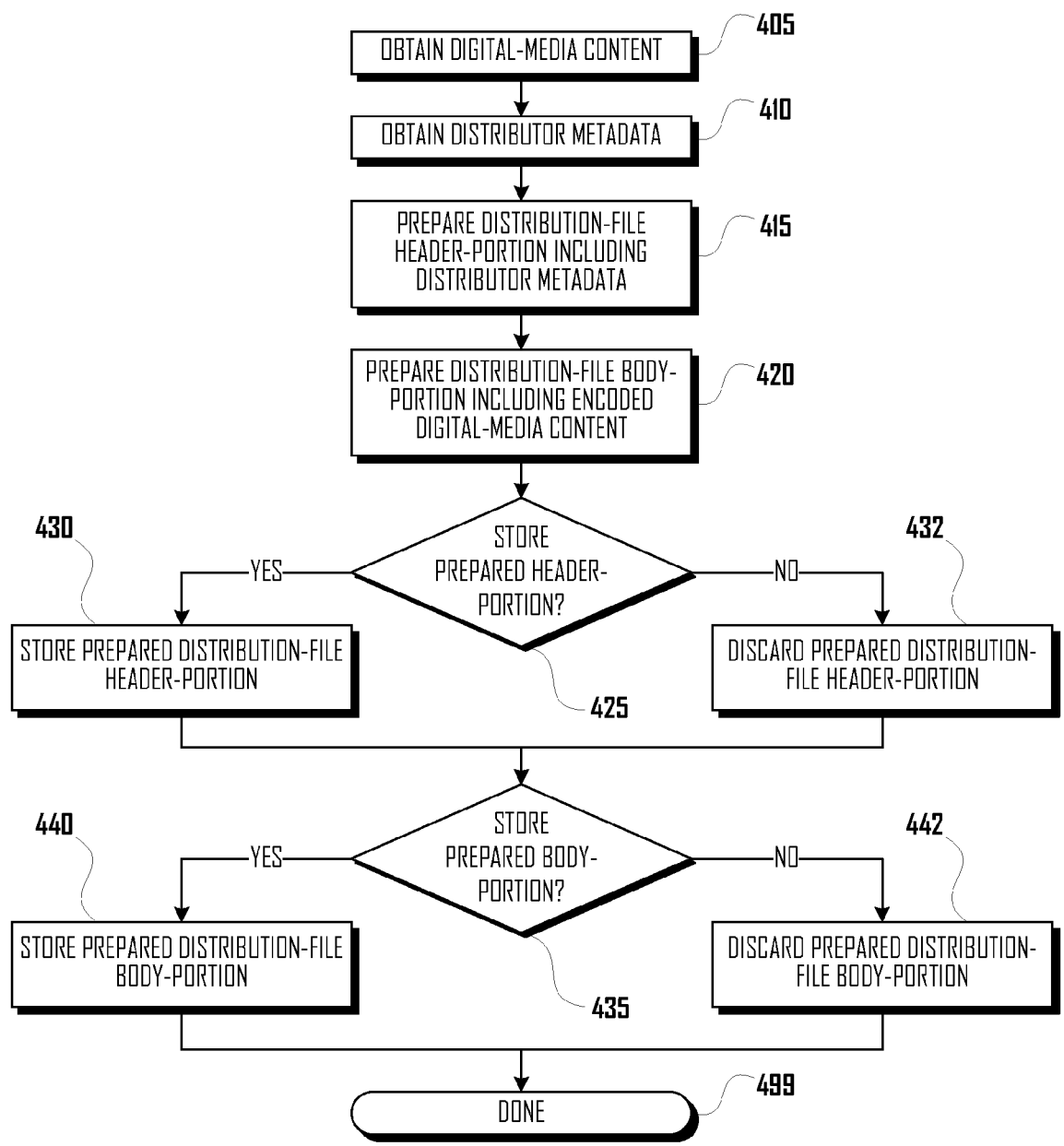
FIG. 4 illustrates subroutine for preparing a distribution-file body-portion in accordance with one embodiment.

FIG. 4 illustrates subroutine 400 for preparing a distribution-file body-portion 810 corresponding to a piece of digital-media content and a distributor. In block 405, subroutine 400 obtains a digital-media content instance corresponding to the piece of digital-media content to be prepared (e.g., from content source 140). As discussed above, the digital-media content instance may be in an analog format and/or a digital first data format. In some embodiments, the first data format may be a "lossless" format. In other embodiments, the first data format may be a raw, relatively unprocessed, and/or uncompressed format. In yet other embodiments, the first data format may also be the same as or similar to a distribution format (such as those discussed above). A digital-media content instance may comprise text, music, pictures, video, games, or other works.

In block 410, subroutine 400 obtains metadata associated with the distributor (e.g., from metadata source 150). In some embodiments, the metadata may be explicitly provided. In other embodiments, the metadata may be determined according to the requested content instance, according to the party calling subroutine 400, and/or according to a party otherwise associated with or identified in the instruction to prepare the distribution-file body-portion.

In block 415, subroutine 400 prepares a header-portion 805 for the distribution-file corresponding to the piece of digital-media content to be prepared. As discussed above in reference to FIG. 8, the header-portion 805 may include non-distributor-specific metadata (e.g., 825, 830), as well as distributor-specific metadata (e.g., 815, 820).

In block 420, subroutine 400 prepares a body-portion 810 for the distribution-file corresponding to the piece of digital-media content to be prepared. As discussed above in reference to FIG. 8, the body-portion 810 includes media-data for the distribution file. In some embodiments, blocks 415 and 420 may be performed as one or more invocations of a media-packaging routine (not shown). In some embodiments, blocks 415 and 420 may further include encoding, transcoding, and/or compressing the digital-media content instance.

In some embodiments, the distribution-file body-portion 810 may be stored (e.g., in repository 900) in the same file as a header-portion including default and/or "dummy" metadata values. For example, such a "default" header-portion may include values for non-distributor-specific metadata (e.g., 825, 830) that will be shared across all distribution-files making use of that particular body-portion. Such a "default" header-portion may further include "dummy" distributor values (i.e., metadata values that are not associated with a distributor that actually distributes media to consumers) for distributor-specific metadata (e.g., 815, 820). In some embodiments, it may be desirable to use "dummy" metadata values in a "default" header-portion so that actual metadata associated with Distributor "B" (for example) is less likely to be erroneously transmitted to a customer of a competing distributor "C" in the event that a bug or other unexpected event causes the system to behave anomalously.

In block 425, subroutine 400 determines whether to store the prepared distribution-file header-portion. If the prepared distribution-file header-portion is to be stored, in block 430, subroutine 400 stores the prepared distribution-file header-portion in a digital-media repository (e.g. 900). In some cases, however, subroutine 400 may determine that the prepared distribution-file header-portion is not to be stored and discard the distribution-file header-portion in block 432. For example, in some embodiments, subroutine 400 may have been invoked with an instruction not to store the header-portion. In other embodiments, subroutine 400 may determine that a corresponding header-portion already exists in the digital-media repository (e.g. 900).

In block 435, subroutine 400 determines whether to store the prepared distribution-file body-portion. If the prepared distribution-file body-portion is to be stored, in block 440, subroutine 400 stored the prepared distribution-file body-portion in a digital-media repository (e.g. 900). In some cases, however, subroutine 400 may determine that the prepared distribution-file body-portion is not to be stored and discard the distribution-file body-portion in block 442. For example, in some embodiments, subroutine 400 may have been invoked with an instruction not to store the body-portion. In other embodiments, subroutine 400 may determine that a corresponding body-portion already exists in the digital-media repository (e.g. 900). Subroutine 400 ends in block 499.

Figure 5:
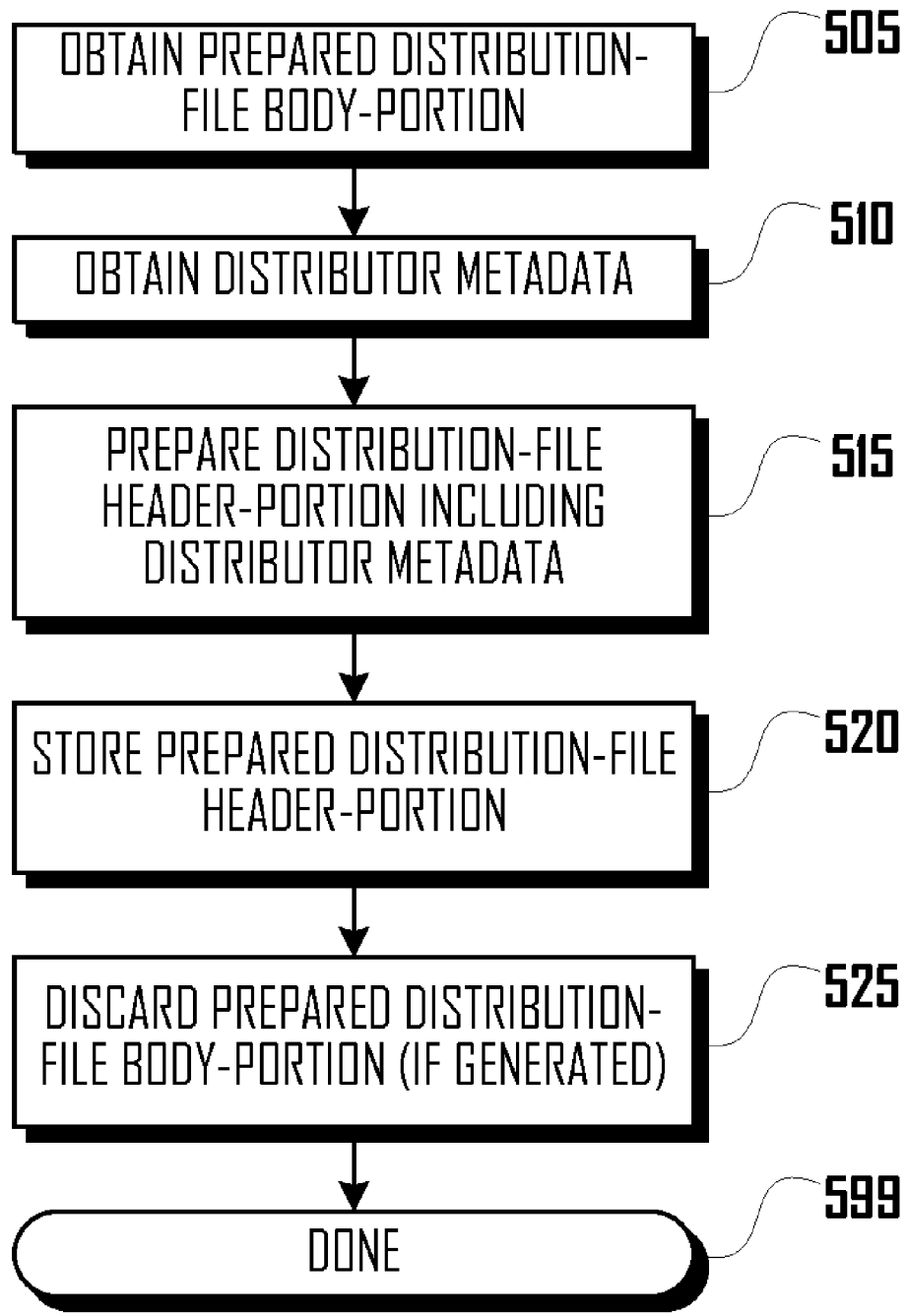
FIG. 5 illustrates a subroutine for preparing and caching a distribution-file header-portion in accordance with one embodiment.

FIG. 5 illustrates a subroutine 500 for preparing and caching a distribution-file header-portion for a particular distributor and a particular distribution-file. In block 505, subroutine 500 obtains a previously-prepared distribution-file body-portion 810 from a digital-media repository (e.g., 900). In some embodiments, the obtained distribution-file body-portion 810 may have been prepared and stored by subroutine 400, discussed above. In some embodiments, the previously-prepared distribution-file body-portion 810 may be stored in the same file as a "default" or "dummy" header-portion. In other embodiments, the previously-prepared distribution-file body-portion 810 may be stored in the same file as a header-portion associated with another actual distributor. In still other embodiments, the previously-prepared distribution-file body-portion 810 may be stored on its own, with no header-portion.

In block 510, subroutine 500 obtains metadata associated with the particular distributor (e.g., from metadata source 150). In some embodiments, the metadata may be explicitly provided. In other embodiments, the metadata may be determined according to the requested distribution-file, according to the party calling subroutine 400, and/or according to a party otherwise associated with or identified in the instruction to prepare the distribution-file body-portion.

In block 515, subroutine 500 prepares a distribution-file header-portion 805 for the particular distribution-file using the obtained metadata and the previously-prepared distribution-file body-portion 810. In some embodiments, preparing the distribution-file header-portion 805 may include invoking a media-packaging routine (not shown) to edit metadata in a header-portion already associated with the previously-prepared distribution-file body-portion 810. In other embodiments, preparing the distribution-file header-portion 805 may include invoking a media-packaging routine (not shown) to add metadata to a headerless, previously-prepared distribution-file body-portion 810. In some embodiments, preparing the distribution-file header-portion 805 may further include encoding, transcoding, and/or compressing the previously-prepared distribution-file body-portion 810.

In some cases, preparing the distribution-file header-portion 805 may include generating all or part of a body-portion that substantially duplicates the previously-prepared distribution-file body-portion 810. As discussed below, any duplicative body-portion-data that may be generated is not persistently stored.

In some embodiments, preparing the distribution-file header-portion 805 may also include binding a distribution-file header-portion 805 to the distribution-file body-portion 810 (or visa versa) using signing techniques, hashing techniques, cryptographic techniques, and the like. Furthermore, In some embodiments, subroutine 500 may encrypt some or all of distribution-file header-portion 805 and/or distribution-file body-portion 810. Alternatively, some or all of distribution-file header-portion 805 and/or distribution-file body-portion 810 may be encrypted before execution of subroutine 500 or after its completion.

In block 520, subroutine 500 stores the prepared distribution-file header-portion 805 in a header repository and/or a digital-media repository (e.g., repository 900). In block 525, subroutine 500 discards any body-portion (or a part thereof) that may have been generated in block 515. Subroutine 500 ends in block 599.

Figure 6:
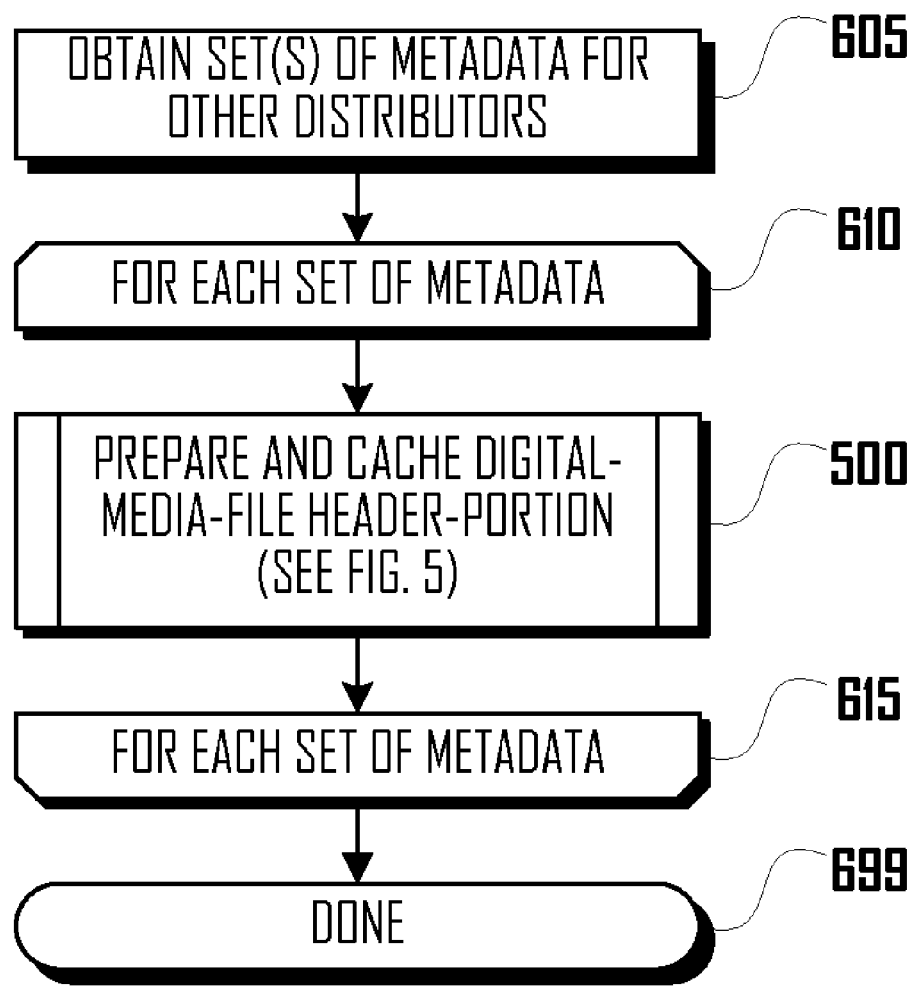
FIG. 6 illustrates a subroutine for pre-generating header-portions in accordance with one embodiment.

FIG. 6 illustrates a subroutine 600 for pre-generating header-portions for other distributors. In block 605, subroutine 600 obtains one or more set(s) of metadata associated with other distributors (e.g., from metadata source 150 or as variously discussed above). Subroutine 600 calls subroutine 500 (see FIG. 5, discussed above) in block 500 to process each of the set(s) of metadata associated with other distributors. In ending loop block 615, subroutine 600 iterates back to block 610 to process the next set of metadata associated with other distributors until all have been processed. In some embodiments, the illustrated serial invocation of subroutine 500 may be implemented as a parallel process. Subroutine 600 ends in block 699.

Figure 7:
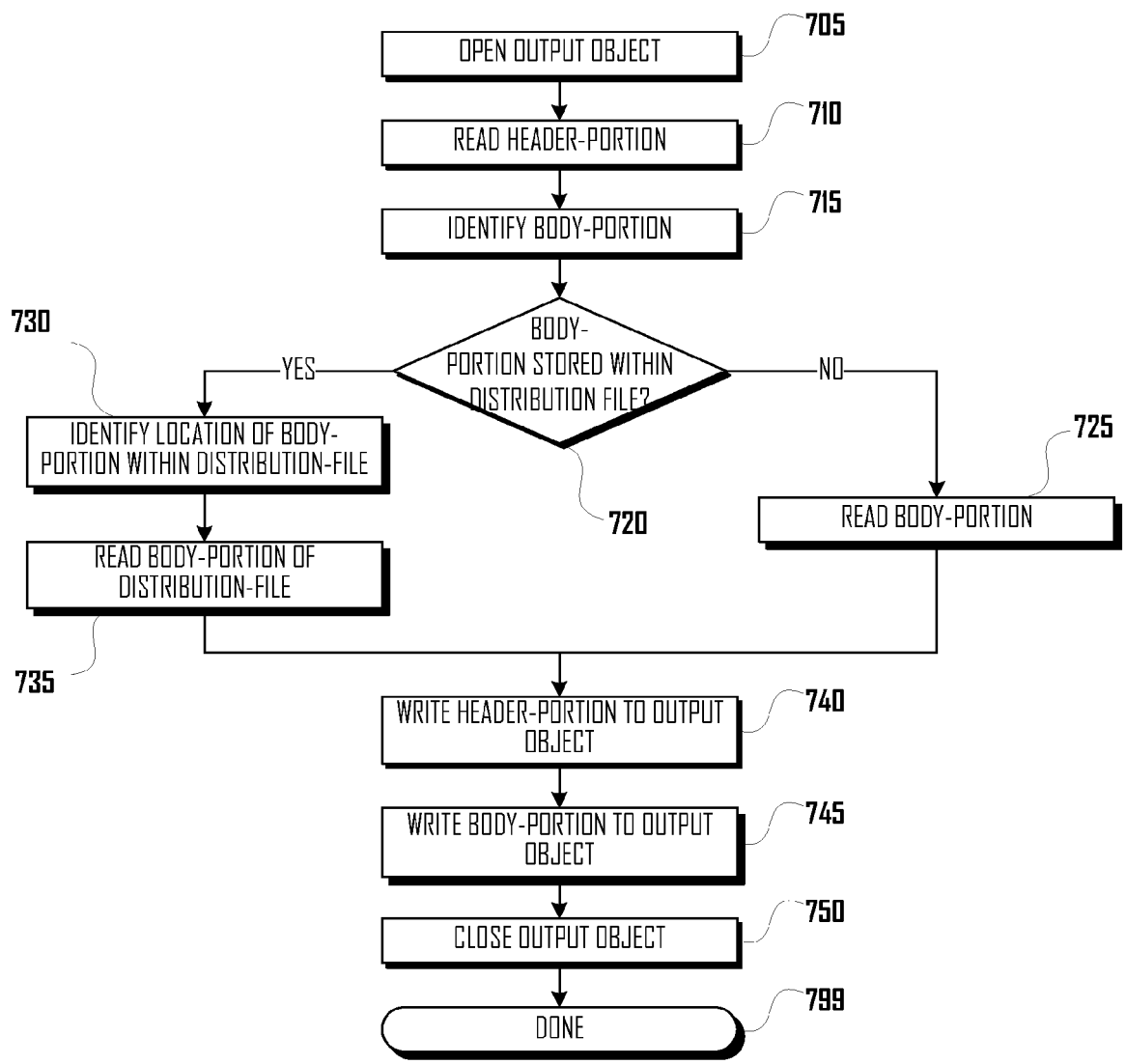
FIG. 7 illustrates a subroutine for serving a distribution file in accordance with one embodiment.

FIG. 7 illustrates a subroutine 700 for serving a particular distribution file associated with a particular distributor. In block 705, subroutine 700 opens an output object to accept data comprising the particular distribution file. For example, in one embodiment, opening the output object may include initializing and/or opening a local or remote file for writing, establishing and/or configuring a connection (e.g., via network 105) with a client device using a communication protocol, e.g., HTTP, Real Time Streaming Protocol ("RTSP"), File Transfer Protocol ("FTP"), and the like.

In block 710, subroutine 700 identifies and reads a header-portion (e.g., from repository 900) corresponding to the particular distribution file and the particular distributor. In block 715, subroutine 700 identifies a body-portion 810 (e.g., stored in repository 900) corresponding to the particular distribution file.

In decision block 720, subroutine 700 determines whether the identified body-portion is stored in its own file (i.e., whether the identified body-portion is not stored as part of a distribution file). If the identified body-portion is not stored as part of a complete or valid distribution file, then in block 725, subroutine 700 reads the identified body-portion.

However, in some embodiments, subroutine 700 may determine in block 720 that the identified body-portion may be stored in a file that also includes a header-portion (e.g., stored as part of a distribution-file associated with or specific to another distributor). In some cases, the included header-portion may include a "default" set of metadata and/or metadata associated with a "dummy" distributor; or in other cases, the included header-portion may simply be associated with another actual distributor.

When the identified body-portion is determined to be stored as part of an other-distributor-specific distribution-file, subroutine 700 determines in block 730 a location of the identified body-portion within the other-distributor-specific distribution-file. For example, in some embodiments, subroutine 700 may parse the other-distributor-specific distribution-file to identify a header object contained therein. In other embodiments, subroutine 700 may retrieve a previously-stored offset, location, and/or address within the other-distributor-specific distribution-file. In still other embodiments, subroutine 700 may scan the other-distributor-specific distribution-file to identify an offset, location, and/or address at which the identified body-portion begins (in some cases, subroutine 700 may further store the offset, location, and/or address for later retrieval). Having determined a location of the identified body-portion within the other-distributor-specific distribution-file, subroutine 700 reads the identified body-portion in block 735.

In block 740, subroutine 700 writes the header-portion read in block 710 to the output object opened in block 705. In various embodiments, block 740 may be performed before, after, and/or contemporaneous with some or all of blocks 715-735. After writing the header-portion to the output object, subroutine 700 writes the body-portion read in block 725 or 735 to the output object. In block 750, after writing the body-portion, subroutine 700 closes the output object (i.e., closes an open file and/or closes a data connection to a remote client device). Thus, in cases in which the output object is a stream of data being sent to a remote client device, subroutine 700 may serve the particular distribution file without the particular distribution file's ever existing per se in repository 900. Rather, in such cases, the particular distribution file may exist per se only after the stream of data is received and processed by the client device. Subroutine 700 ends in block 799.

Figure 3:
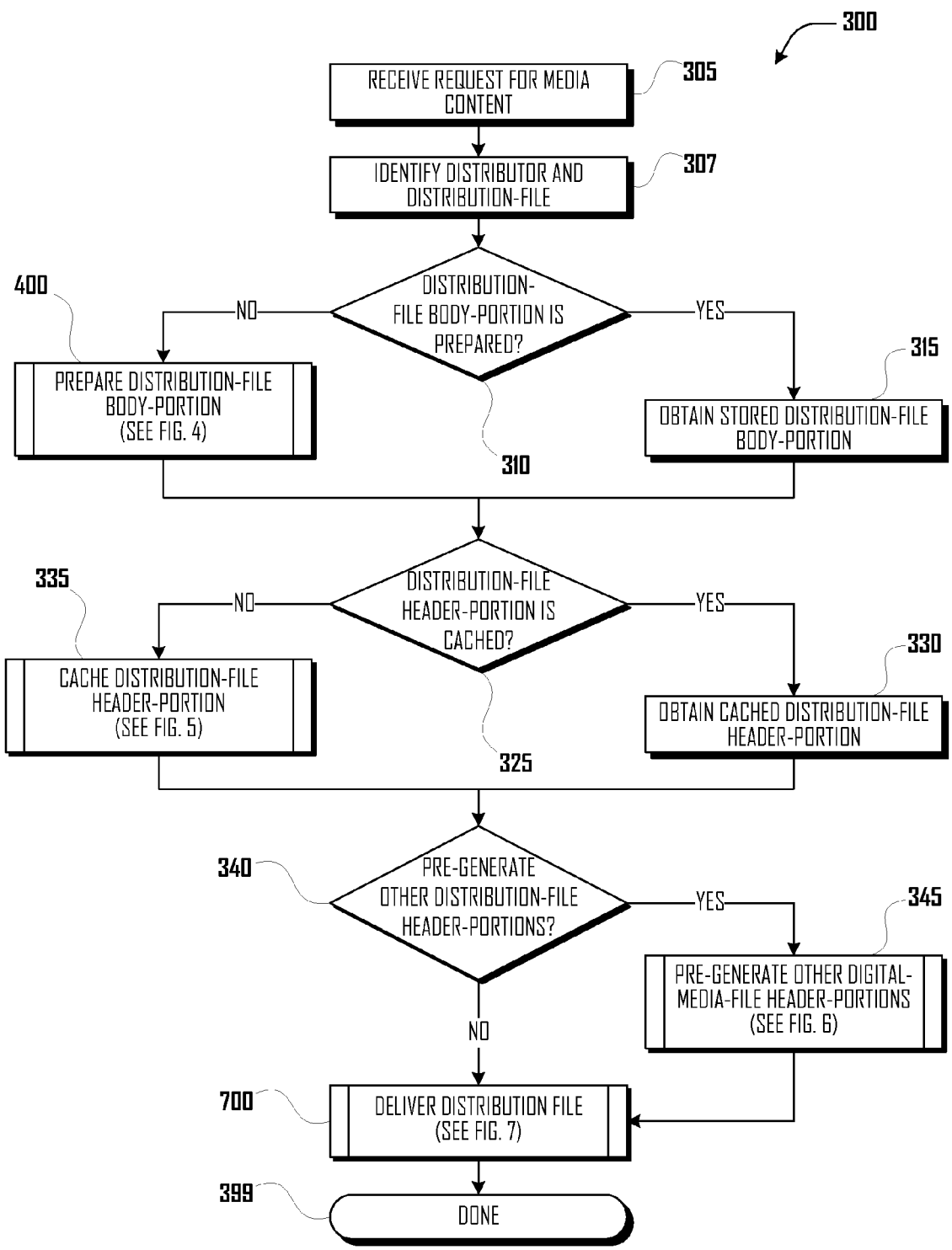
FIG. 3 illustrates routine for preparing distribution files when a request for content is received in accordance with one embodiment.
Figure 10:
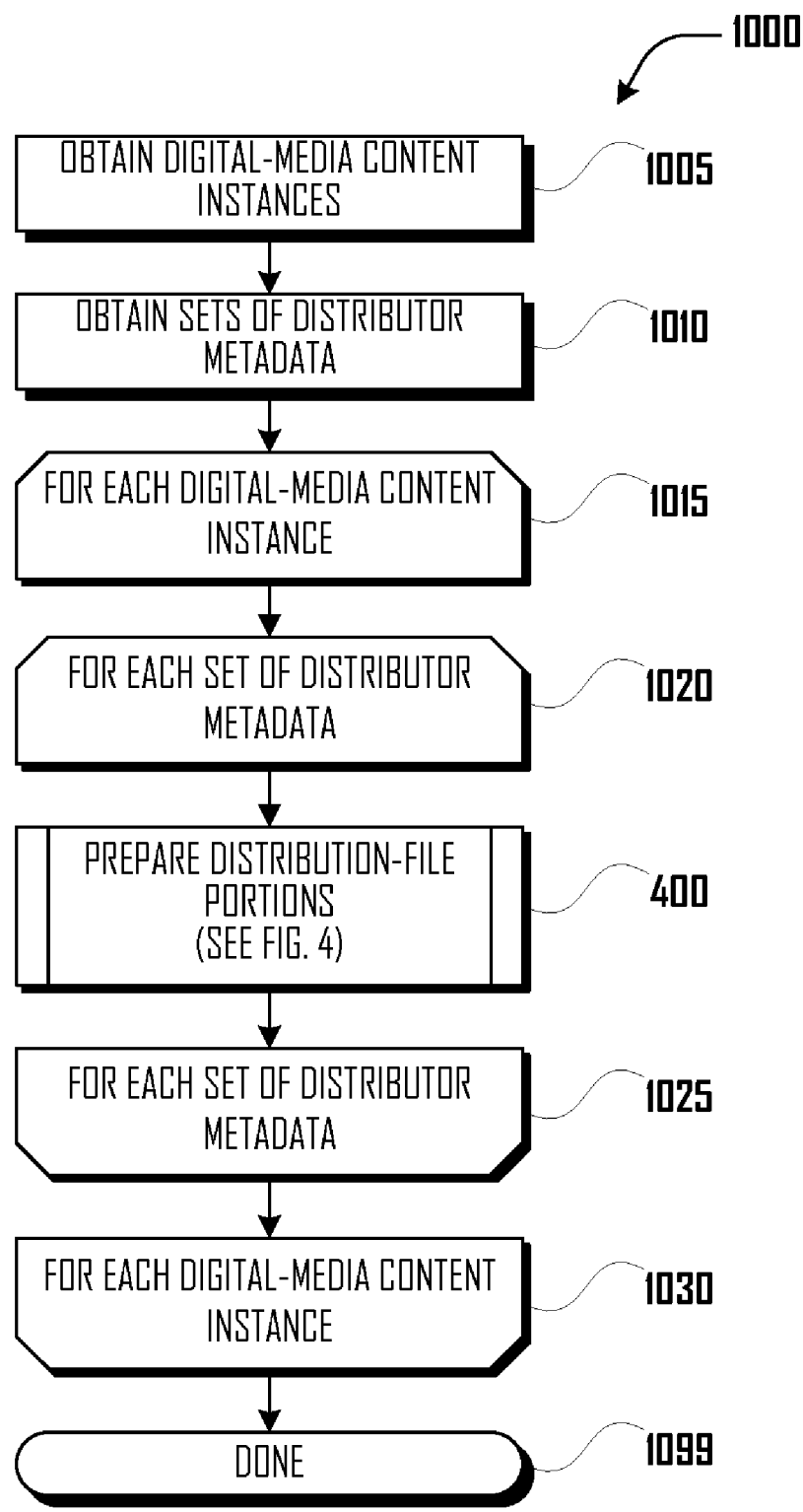
FIG. 10 illustrates a media package routine in accordance with one embodiment.

FIG. 10 illustrates a media package routine 1000 in accordance with one embodiment. Whereas FIG. 3 illustrates an "on the fly" routine 1000 for preparing distribution files when a request for content is received, routine 1000 illustrates a "batch" routine for pre-packaging distribution-file body- and/or header-portions. In block 1005, routine 1000 obtains one or more digital-media content instances, e.g., from content database 140 (see FIG. 1). As discussed above, in various embodiments, a content instance may comprise text, music, pictures, video, games, or other works and may be stored in an analog format and/or a digital first data format. In some embodiments, the first data format may be a "lossless" format. In other embodiments, the first data format may be a raw, relatively unprocessed, and/or uncompresssed format. In yet other embodiments, the first data format may also be the same as or similar to a distribution format (such as those discussed above).

In block 1010, routine 1000 obtains one or more sets of metadata (e.g., from metadata source 150), the one or more sets of metadata being associated, respectively, with one or more distributors. In some embodiments, the metadata may be explicitly or implicitly provided to routine 1000. In some embodiments, one of the sets of metadata may be associated with a "dummy" distributor and/or include a "default" set of values. In some embodiments, routine 1000 may additionally obtain metadata associated with the digital-media content instances obtained in block 1005. In some cases, such additionally-obtained metadata may be common to all distributors.

From beginning loop block 1015 to ending loop block 1030, routine 1000 iterates over each digital-media content instance obtained in block 1005. From beginning loop block 1020 to ending loop block 1025, routine 1000 iterates over each set of metadata obtained in block 1010, calling subroutine 400 (see FIG. 4, discussed above) to prepare distribution-file header- and/or body-portions for the current combination of content instance and set of metadata. In some embodiments, subroutine 400 may be instructed to store only one body-portion that will be common to all distributors associated with the sets of metadata obtained in block 1010, storing only header-portions for the remaining distributors, which may save significant amounts of storage space.

While blocks 1015-1030 are depicted as an inner and an outer loop, in other embodiments, the inner- and outer-loop bodies may be swapped and/or equivalent functionality may be obtained using alternate control structures, including processing some or all of the combinations of distributor-specific metadata and content-instance in parallel. Routine 1000 ends in block 1099. In some embodiments, routine 1000 may itself be performed iteratively (in series or in parallel). For example, in some cases, there may be multiple groups of distributors that share a common trait (e.g., a group of distributors may share a common encryption key and/or scheme), each group of distributors being processed in a separate instance of routine 1000.

Figure 11:
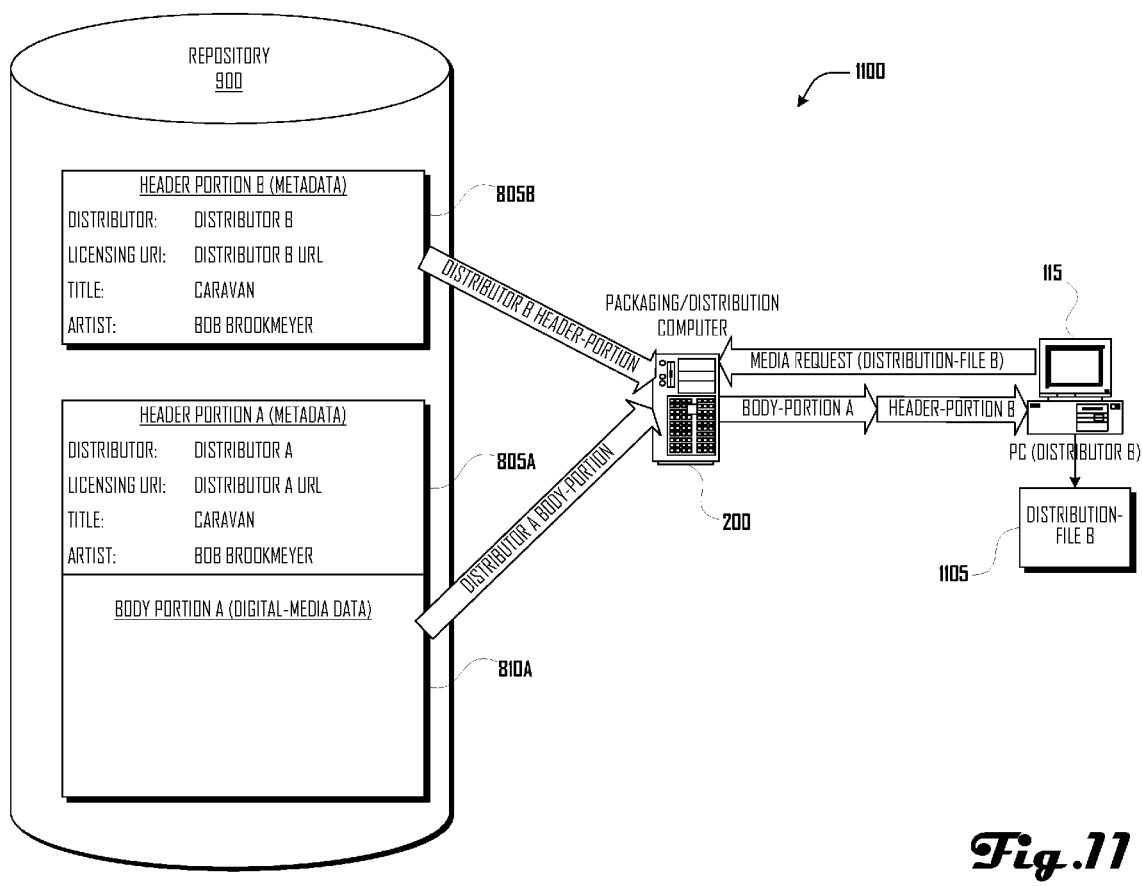
FIG. 11 is a diagram illustrating an exemplary media request and service scenario in accordance with one embodiment.

FIG. 11 graphically depicts aspects of an exemplary scenario in which a client device 115 that is associated with a distributor "B" sends a request for distribution-file "B" to Packaging/Distribution computer 200. Packaging/Distribution computer 200 retrieves from repository 900 a body-portion 810A and a header-portion 805B corresponding to distribution-file "B" (see, e.g., FIG. 3). Body-portion 810A is depicted as being stored with a header-portion 805A that does not correspond to distributor "B" (e.g., in some embodiments, header-portion 805A may be associated with a "dummy" distributor). Packaging/Distribution computer 200 delivers the header- and body-portions to client device 115 (see, e.g., FIG. 7), which may then assemble the received header- and body-portions into distribution-file "B" 1105 for rendering and/or storing (transiently or persistently) at the client device.

Although specific embodiments have been illustrated and described herein, it will be appreciated by those of ordinary skill in the art that a whole variety of alternate and/or equivalent implementations may be substituted for the specific embodiments shown and described without departing from the scope of the present disclosure. This application is intended to cover any adaptations or variations of the embodiments discussed herein.

The invention claimed is:

1. A computer-implemented method for packaging digital media, the method comprising:
obtaining, by a packaging computer, a first set of metadata associated with a first media distributor and a distinct second set of metadata associated with a second media distributor;
preparing, by said packaging computer, a body-portion of a first distribution-file, said first-distribution-file body-portion comprising digital-media data;
preparing, by said packaging computer, a header-portion of said first-distribution-file, said first-distribution-file header-portion comprising said first set of metadata;
storing said first-distribution-file header-portion and said first-distribution-file body-portion in a digital-media repository;
preparing, by said packaging computer, a header-portion of a second distribution-file, said second-distribution-file header-portion comprising said second set of metadata;
storing in said digital-media repository only said header-portion of said second-distribution-file;
receiving a request for said second-distribution-file from a client device;
obtaining said second-distribution-file header-portion from said digital-media repository;
obtaining said first-distribution-file body-portion from said digital-media repository; and
delivering to said client device said second-distribution-file according to said second-distribution-file header-portion and said first-distribution-file body-portion.

2. The method of claim 1, wherein obtaining said first-distribution-file body-portion comprises:
retrieving said first distribution-file from said digital-media repository; and
identifying a location of said first-distribution-file body-portion within said first distribution-file.

3. The method of claim 1, wherein delivering to said client device said second-distribution-file comprises sending to said client device a file stream comprising said second-distribution-file header-portion and said first-distribution-file body-portion.

4. The method of claim 1, wherein said first media distributor comprises a dummy distributor and said first set of metadata comprises a set of default metadata values.

5. The method of claim 1, wherein said storing said first-distribution-file header-portion and said first-distribution-file body portion comprises storing said first distribution-file.

6. The method of claim 1, wherein said first distribution-file and said second distribution-file comprise a time-based digital media file.

7. The method of claim 1, wherein said first-distribution-file header-portion and said second-distribution-file header-portion further comprise a shared third set of metadata associated with said digital-media data.

8. The method of claim 1, further comprising determining that a body-portion of said second-distribution-file duplicates said first-distribution-file body-portion stored in said digital-media repository.

9. A non-transitory computer-readable storage medium having stored thereon instructions that, when executed by a processor, perform the method of claim 1.

10. A computing apparatus comprising a processor and a memory, the memory including instructions that, when executed by the processor, perform the method of claim 1.

11. A computer-implemented method for delivering digital media for a plurality of distributors by a media-serving computer, the method comprising:
  receiving, by the media-serving computer from a client device, a request for digital-media content, said request being associated with a first distributor of the plurality of distributors;
  retrieving, from a digital-media repository, a body-portion of a first distribution-file, said first-distribution-file body-portion comprising digital media-data corresponding to said requested digital-media content;
  obtaining, by the media-serving computer, a header-portion of a second distribution-file, said second-distribution-file header-portion corresponding to said requested digital-media content, said second-distribution-file header-portion including metadata associated with said first distributor;
  delivering, by the media-serving computer to said client device, said second distribution-file comprising said distribution-file header-portion and said first-distribution-file body-portion, wherein said second distribution-file is associated with said first distributor;
  receiving a second request for said digital-media content from a second client device, said second request being associated with a second distributor of the plurality of distributors;
  obtaining a header-portion of a third distribution-file corresponding to said requested digital-media content, said third-distribution-file header-portion including metadata associated with said second distributor; and
  delivering to said second client device said third distribution file according to said third-distribution-file header-portion and said first-distribution-file body-portion.

12. The method of claim 11, wherein delivering said second distribution-file comprises sending a digital-media file-stream associated with said first distributor, said digital-media file-stream comprising said second-distribution-file header-portion and said first-distribution-file body-portion.

13. The method of claim 11, wherein said first distribution-file further comprises a header-portion including metadata associated with a dummy distributor.

14. The method of claim 11, wherein obtaining said second-distribution-file header-portion comprises selecting said second-distribution-file header-portion from among a plurality of alternative distribution-file header-portions stored in a header repository, said plurality of alternative distribution-file header-portions being respectively combinable with said first-distribution-file body-portion to form a plurality of digital-media distribution-files.

15. The method of claim 11, wherein obtaining said second-distribution-file header-portion comprises:
  obtaining metadata associated with said first distributor;
  generating said second-distribution-file header-portion according to said obtained metadata and said first-distribution-file body-portion; and
  storing said second-distribution-file header-portion in a header repository.

16. The method of claim 11, further comprising:
  in response to receiving said request for said digital-media content, said request being associated with said first distributor, identifying a second distributor that can share said digital-media content with said first distributor;
  obtaining second metadata associated with said second distributor;
  pre-generating a third distribution-file header-portion according to said second metadata and said first-distribution-file body-portion; and
  storing said third distribution-file header-portion in said header repository.

17. The method of claim 11, wherein said wherein said first distribution-file comprises a time-based-digital-media file.

18. A non-transitory computer-readable storage medium having stored thereon instructions that, when executed by a processor, perform the method of claim 11.

19. A computing apparatus comprising a processor and a memory, the memory including instructions that, when executed by the processor, perform the method of claim 11.

* * * * *